(12) United States Patent
Herrera

(10) Patent No.: US 7,725,138 B2
(45) Date of Patent: May 25, 2010

(54) APPARATUS FOR CONTROL OF IN-BATTERY MODULE

(75) Inventor: Richard Herrera, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 499 days.

(21) Appl. No.: 11/610,882

(22) Filed: Dec. 14, 2006

(65) Prior Publication Data

US 2008/0146188 A1   Jun. 19, 2008

(51) Int. Cl.
*H04M 1/00*   (2006.01)
*H04B 1/16*   (2006.01)

(52) U.S. Cl. .................. 455/572; 455/343.1; 455/343.6

(58) Field of Classification Search ................. 455/572, 455/573, 574, 343.1, 127.1, 343.6
See application file for complete search history.

(56) References Cited

U.S. PATENT DOCUMENTS

| | | | | |
|---|---|---|---|---|
| 4,965,550 A | * | 10/1990 | Wroblewski | 340/524 |
| 5,576,941 A | * | 11/1996 | Nguyen et al. | 363/21.07 |
| 5,646,501 A | * | 7/1997 | Fishman et al. | 320/112 |
| 5,717,306 A | * | 2/1998 | Shipp | 307/125 |
| 5,889,381 A | * | 3/1999 | Wakefield | 320/106 |
| 6,108,751 A | * | 8/2000 | Lee et al. | 711/115 |
| 6,122,704 A | * | 9/2000 | Hass et al. | 711/100 |
| 6,307,282 B1 | | 10/2001 | Yu et al. | |
| 2004/0017361 A1 | | 1/2004 | Lieu | |
| 2005/0073282 A1 | * | 4/2005 | Carrier et al. | 320/106 |

FOREIGN PATENT DOCUMENTS

| | | |
|---|---|---|
| JP | 06162279 A1 | 6/1994 |
| WO | 2008076489 A1 | 6/2008 |

OTHER PUBLICATIONS

PCT International Search Report and Written Opinion Application No. PCT/US07/78723—Dated Mar. 28, 2008—9 Pages.

* cited by examiner

*Primary Examiner*—Sonny Trinh
(74) *Attorney, Agent, or Firm*—Barbara R. Doutre

(57) ABSTRACT

An apparatus (100) is provided for powering an in-battery electronic application module (118) without the use of an external on/off switch. A battery pack (102) is electrically coupled to a radio (104) via three interface contacts: power (108), ground (112) and single-wire serial data port (110). Circuitry is included within the battery pack (102) to sense and monitor data activity on the single-wire serial data port (110) generated as the radio (104) is turned on. Based on the level and timing (200) of the data activity present on the single-wire serial port (110), the electronic application module (118) can automatically be turned on (208), remain on (210) and turned off (212).

10 Claims, 2 Drawing Sheets

APPARATUS FOR CONTROL OF IN-BATTERY MODULE

FIELD OF THE INVENTION

The present invention relates generally to battery packs and more specifically to in-battery modules providing electronic applications for portable communication devices.

BACKGROUND

Portable battery powered communication devices, such as radios and cellular telephones, continue to provide additional features to the consumer. To this end, designers have had to integrate and miniaturize an increasing number of circuits and features within the device. Recently, designers have even started incorporating radio features, in the form of application specific modules, within the battery pack. These application specific modules are manually turned on and off via an on/off switch. The on/off switch is not typically available to the end-consumer but is usually set at the factory or by a service shop.

The ability to upgrade a portable radio without taking the radio to a service shop for programming and without additional interface hardware is highly desirable. Adding radio functionality to the battery pack poses several challenges, one being that the radio electronics located in the battery pack must be turned off when the radio is turned off, so as not to drain the battery cell(s). While an additional contact can be used to provide this on/off capability, older existing radios can not be retrofitted and newer radios require a larger interface connector thereby increasing parts count and cost.

Accordingly, it would be desirable to have a battery pack with a simplified on/off control of an in-battery application module.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
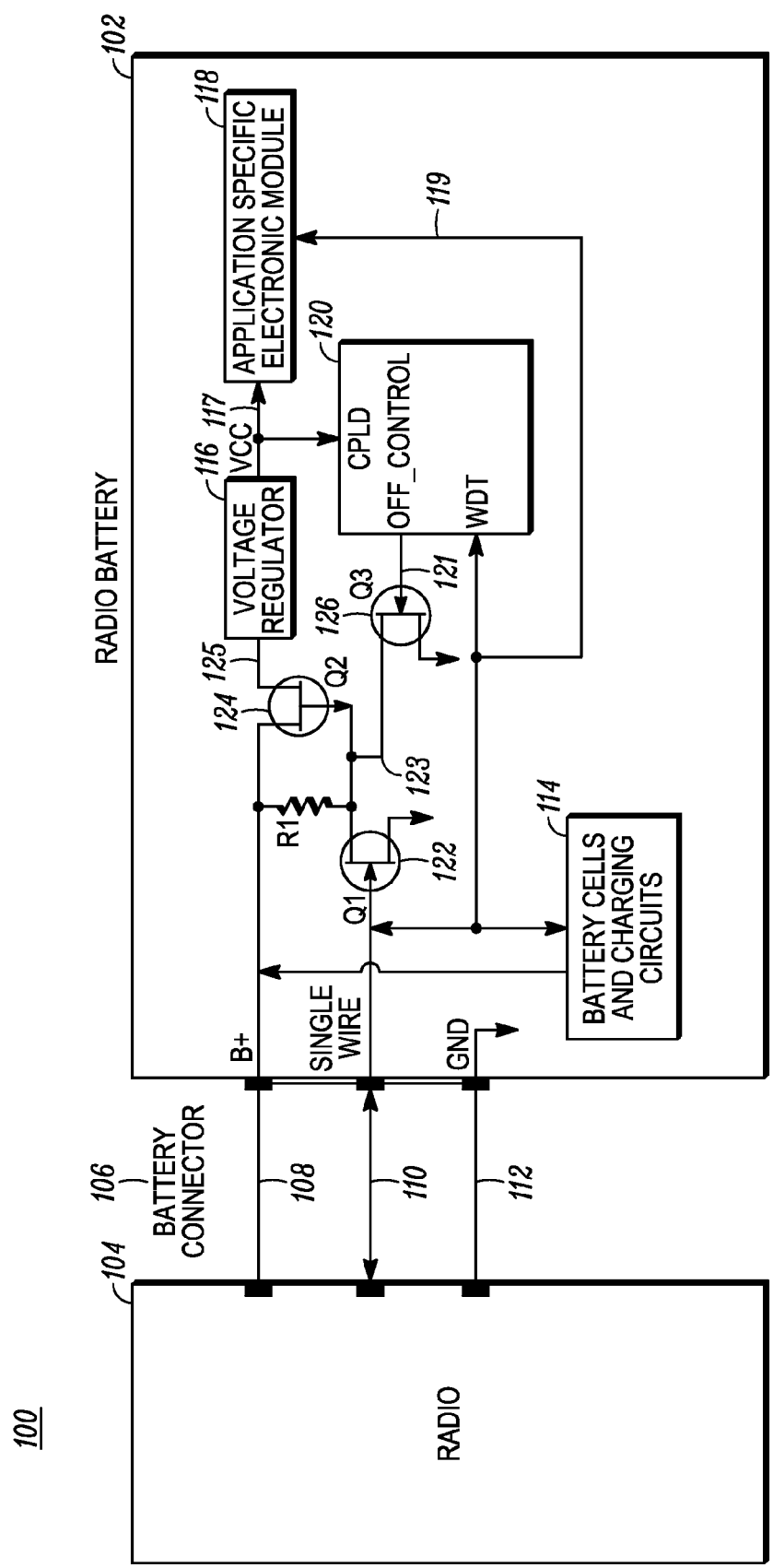
FIG. 1 is a block diagram of a battery pack having an in-battery module with automated internal control in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in an apparatus for controlling an in-battery radio application feature by providing automated on/off functionality to the feature. Thus, a consumer is able to upgrade additional radio application features without having to bring the radio to a service shop or download the feature from a personal computer. The user simply connects a battery pack having a desired application specific electronic application module incorporated therein. The internal application module automatically provides increased functionality to the user. The automated on/off power control of the in-battery application module is achieved without the use of additional interface contacts. There is no need for the application module to be installed or programmed by another party, making the battery pack having automated on/off power control of the in-battery application module very desirable to consumers.

The battery pack to be described herein utilizes a three wire battery-radio interface with the addition of monitoring circuitry for detecting electronic data activity on one of the three lines. Based on the level of data activity, the control circuitry turns the radio application features contained within the battery on and off automatically, without the use of an external switch.

Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

FIG. 1 is a block diagram of a battery pack having an in-battery module with automated internal control in accordance with some embodiments of the invention. Block diagram 100 includes battery pack 102 coupled to portable radio 104 via a three contact interface 106. Interface 106 includes power interface (B+) 108, single-wire interface 110 and ground interface (GND) 112. Single-wire interface 110 provides a dedicated line for radio-battery data intercommunications utilizing known single-wire protocols. Battery pack 102 includes battery cells and charging circuits 114 providing power to the portable radio 104. In accordance with the present invention, battery pack 102 further includes an application specific electronic module 118 under the control of electronic circuitry that automatically turns the in-battery application specific module on and off via the single-wire interface 110.

In accordance with the present invention, data intercommunications present on the single-wire interface 110 are used to control an on/off condition for the application module 118. The on/off control circuitry operating in accordance with the present invention takes advantage of the "signature" of the data waveform to decode the on/off condition. The data on the single-wire interface is usually battery status information that the radio microprocessor (not shown) monitors via a single-wire device located in the radio, such as a 1-Wire™ device available from Dallas Semiconductor. In accordance with the present invention, the battery pack's control circuitry, an example of which is discussed below, detects data activity on the single-wire interface 110 generated by the portable radio 104. The battery pack's control circuitry monitors logic levels of the data activity over time and compares the time to predetermined timing thresholds to automatically control powering the in-battery application module 118 on and off.

For the purposes of this application, the terms signal wire interface and single-wire signal will be designated by designator 110. An example of an on/off control circuit embodiment is provided by a plurality of switching transistors Q1 122, Q2 124 and Q3 126, a voltage regulator 116 and a logic device 120. Logic device 120 includes, for example, timing capability for monitoring transition levels occurring on the single-wire interface 110. Prior to the radio 104 being turned on, the single-wire interface is at substantially zero volts causing the control circuitry to be turned off and any application specific electronics 118 residing in the battery to be turned off. When the radio 104 is turned on, the single-wire interface 110 transitions to a digital logic high voltage. The logic level high causes transistor Q1 122 to turn on, which in turn causes the gate of transistor Q2 to transition to a substantially zero volt value. When the base of transistor Q2 124 is pulled low, transistor Q2 124 turns on, which allows the power signal (B+) to be injected at an input 125 of the voltage regulator 116. The power signal (B+) is a positive battery voltage that ranges, for example, from 6 to 9 volts, depending on the application. When the voltage regulator 116 receives power (B+) at input 125, the regulator turns on and generates a regulated voltage output (Vcc) 117. The regulated voltage 117 powers the in-battery application specific electronic module 118 and the logic device 120.

In this embodiment, the logic device 120 is shown as a complex programmable logic device (CPLD) including a watch-dog timer (WDT) for monitoring the transition changes on the single-wire interface 110 as well as providing an on/off control output 121 to the base of transistor Q3 126. The in-battery application specific module 118 can embody any electronics that a manufacturer wishes to include within the battery pack 102 for specific radio related applications or other user related purposes. An example of an in-battery application specific module is a radio frequency (RF) circuit dedicated to receive biometric sensor data. A module of this type can receive and send data to/from the radio 104 via the signal path 119 and single-wire interface 110.

Upon power up of the logic device 120 by the regulated voltage (Vcc) 117, the logic device's "off_control" output 121, which is connected to the base of transistor Q3 126, goes high which in turn switches transistor Q3 126 on. This assures that the base of Q2 122 stays low (close to 0 volts). Thus, when the "off_control" signal 121 goes high, the state of transistor Q2 124 becomes "latched" to stay on. This latching is done to prevent transistor Q2 124 from turning off when the single-wire signal begins to toggle due to protocol data activity.

The internal logic of the logic device 120, embodied here as a CPLD, operates as follows. When the CPLD is initially powered up, the off_control output pin transitions to a high digital state. The watch dog timer (WDT) input pin routes the single-wire signal to the WDT logic residing within the CPLD. The watch dog timer (WDT) logic decodes the single-wire signal to determine when the single-wire signal 110 stays low for a predetermined amount of time (Toff). Once the predetermined amount of time is reached, the output off_control 121 goes to a low digital state—indicating the radio is turned off. The low digital state is maintained until the radio is powered back on and the voltage regulator 116 is turned back on again Some time after the radio 104 has been turned on, the single-wire signal 110 begins to toggle from high to low due to single-wire serial bus activity, the watch dog timer (WDT) input at the CPLD monitors the single-wire activity and triggers an internal watch dog timer state machine that monitors how long this signal stays low and compares it to the predetermined time that is programmed into the CPLD. As described above, this predetermined time is the turn off value (shown by designator 212 in FIG. 2). This predetermined time represents the maximum amount of time where the single-wire signal 110 stays in a low state while there is bus activity, this time being referred to as Toff as will be shown in FIG. 2. Since the CPLD is a programmable hardware device, the user can have the manufacturer of the CPLD program a unique value for Toff, if desired. If the WDT of logic device 120 detects a low state in the single-wire signal greater than Toff, the CPLD interprets this event as the radio being turned off and drives the off_control output 121 from the CPLD to a low which causes transistor Q3 126 and Q2 124 to turn off. When transistor Q2 124 turns off the voltage regulator 116 is turned off and all power to all modules disappears which causes all subsystems to turn off.

While the example of the on/off control circuitry embodiment has been provided showing switching transistors Q1 122, Q2 124 and Q3 126, voltage regulator 116 and logic device 120 as discrete components external to the application specific electronic module 118, the on/off control circuitry can be integrated either partially or wholly within the module 118 as well. Additional and/or fewer components and circuit topologies might also be utilized depending on the timing requirements and power levels of the radio, while still maintaining a battery pack having a three wire battery-radio interface with monitoring circuitry for detecting electronic data activity on one of the three lines. Providing internal control to the battery pack of the present invention provides the significant advantage of in-battery radio application features being turned on and off automatically as the radio is turned on and off.

Figure 2:
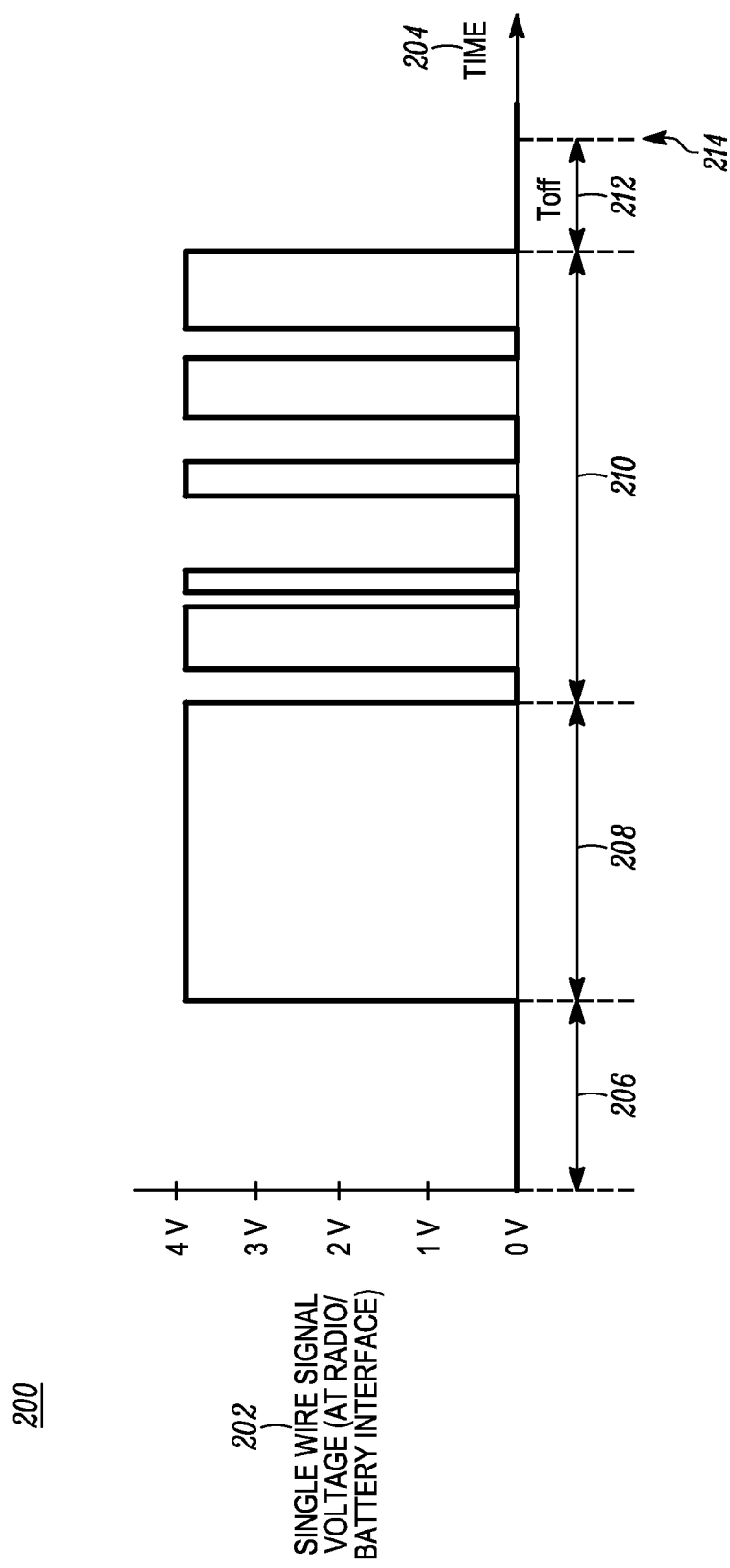
FIG. 2 is an example of a single-wire signal histogram at the battery/radio interface in accordance with some embodiments of the invention.

FIG. 2 is an example of a single-wire signal histogram 200 at the battery/radio interface in accordance with some embodiments of the invention. Histogram 200 shows single-wire voltage 202 at the radio/battery interface along a vertical axis, relative to time 204 along a horizontal axis. Designator 206 represents the time during which the single-wire signal changes from zero volts to approximately 3.9 volts (a digital high in this example) when the radio is turned on. Designator 208 represents a time period in which the on/off control for the in-battery application module detects the digital high level voltage of the signal wire signal and routs the internal battery voltage to any application specific electronics that reside in the battery. The data activity occurring along designator 210 represents the data toggling activity that occurs during normal radio operation. The data toggling continues until the radio is turned off. The timer (watch dog timer logic in the CPLD) monitors the time the signal stays in the low state. If the one wire signal goes low and stays low for a predetermined amount of time represented by designator 212, then the on/off control proceeds to disable power to the application specific electronics residing in the battery at designator 214.

Adding the control of radio features within the battery pack of a portable radio in a manner provided by the invention offers several benefits to the end user. Existing field radios can now easily be retrofitted with new features by simply having the user couple a new battery having the desired features to the radio. The battery pack formed in accordance with the present invention provides the additional radio application features and control without changing the battery-radio connector interface. Thus, a consumer can upgrade the radio to higher tier functionality just by upgrading to a new battery pack.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A battery pack for a portable radio, the battery pack comprising:
　an in-battery application module;
　a power interface;
　a ground interface;
　a single-wire interface; and
　electronic circuitry for automatically turning the in-battery application module on and off via the single-wire interface, wherein the battery pack's electronic circuitry monitors logic levels of the data activity over time and compares the time to predetermined timing thresholds to automatically control powering the in-battery application module on and off.

2. The battery pack of claim 1, wherein the single-wire interface automatically turns the in-battery application module on and off in response to the radio being turned on and off.

3. The battery pack of claim 2, wherein the battery pack's electronic circuitry detects data activity on the single-wire interface generated by the portable radio.

4. A battery pack, comprising:
　at least one battery cell;
　an electronic application module;
　logic and switching circuitry;
　three interface contacts consisting of power, ground and single-wire; and
　the logic circuitry receiving a data signal via the single-wire interface for automatically controlling the power to the electronic application module, without the use of an external switch, the electronic application module turning on in response to the data signal on the single-wire interface remaining high for a predetermined amount of time, the electronic application module remaining on in response to data activity on the single-wire interface, and the electronic application module turning off in response to the data signal on the single-wire interface transitioning low for a predetermined amount of time.

5. A portable radio, comprising:
　a radio portion having first, second and third interface contacts;
　a battery pack electrically coupled to the radio portion via the first, second and third interface contacts, the first and second interface contacts providing power and ground and the third interface contact for transferring serial data; and
　an application module coupled within the battery pack, the application module being powered on and off in response to data activity generated from the portable radio being present on the third contact, wherein the application module turns on in response to the third interface contact receiving a logic level high, and the application module remains on during serial data activity on the third interface contact, and wherein the application module turns off in response to the third interface contact receiving a logic level low for a predetermined amount of time.

6. The portable radio of claim 5, wherein the application module is turned on and off without the use of an external on/off switch.

7. The portable radio of claim 5, wherein the predetermined amount time is user dependent.

8. The portable radio of claim 5, wherein the battery pack application module provides a first set of radio features, and the portable radio is upgradeable by replacing the battery pack with another battery pack having a different application module providing a second set of radio features.

9. The portable radio of claim 5, wherein the battery pack is replaceable by the user.

10. A portable radio, comprising:
　a radio portion having first, second and third interface contacts;
　a battery pack electrically coupled to the radio portion via the first, second and third interface contacts, the first and second interface contacts providing power and ground and the third interface contact for transferring serial data; and
　an application module coupled within the battery pack, the application module being powered on and off in response to data activity generated from the portable radio being present on the third contact;
　electronic circuitry within the battery pack for monitoring transitions of serial data activity on the third contact and powering up the application module in response thereto;
　wherein the electronic circuitry within the battery pack monitoring the serial data activity on the third contact and powering the application module includes: a plurality of switching transistors; a voltage regulator and a logic device, wherein the plurality of transistors includes first, second and third transistors; and
　upon initial power up of the portable radio, the first transistor turning on, which in turn causes the second transistor to enable the voltage regulator, which in turn applies a regulated voltage to power up both the logic device and the application module, the logic device thereby turning on the third transistor which in turn latches the second transistor to remain on during toggling of the serial data on the third contact thereby maintaining power to the application module until the radio is turned off and the toggling of the serial data ceases.

* * * * *